United States Patent Office 3,522,307
Patented July 28, 1970

3,522,307
OCTAHYDROMETHENOPENTALENE-5-AMINE
Claus Dieter Weis, Arlesheim, Basel-Land, Switzerland, assignor to Geigy Chemical Corporation, Ardsley, N.Y., a corporation of New York
No Drawing. Filed Dec. 15, 1967, Ser. No. 690,751
Int. Cl. C07c 87/40; A61k 27/00
U.S. Cl. 260—563                    2 Claims

ABSTRACT OF THE DISCLOSURE

Octahydro - 1,2,4 - methenopentalenyl-5-amine is prepared by several methods. This amine, acid addition salts thereof, and therapeutic compositions containing this amine or acid addition salts thereof possess antiviral properties and are used for controlling viral infections in mammals.

---

This invention relates to an octahydromethenopentalene derivative having valuable pharmacological properties. More specifically, the present invention pertains to octahydro-1,2,4-methenopentalenyl-(5)-amine, and to acid addition salts thereof. This invention further concerns therapeutic compositions containing said octahydromethenopentalenyl amine or pharmaceutically acceptable acid addition salts thereof and a pharmaceutical carrier. Another object of the invention is to provide methods of controlling infections in a mammal caused by a virus, especially of infections caused by influenza virus $A_2$.

Octahydro - 1,2,4 - methenopentalenyl - (5) - amine of Formula I

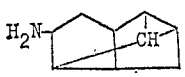

(I)

is produced according to the invention by degrading a reactive functional derivative of octahydro-1,2,4-methenopentalenyl-(5)-carboxylic acid or this acid itself by the processes according to Hofmann, Curtius, or Lossen. The amine obtained can be converted with suitable acids via conventional methods into pharmaceutically acceptable salts.

Reactive functional derivatives used as starting materials are, for the Hofmann degradation, the amide, for the Curtius degradation, the azide, and for the Lossen degradation, hydroxamic acid, its salts or O-acyl derivatives.

The Hofmann degradation of the acid amide is performed by heating the carboxylic acid amide with bromine or chlorine or an agent generating bromine or chlorine, in the presence of an alkali or alkaline earth metal hydroxide or an acid. For the production of octahydro-1,2,4-methenopentalenyl-(5)-amine from the corresponding carboxylic acid amide, the modification according to Jeffrey is to be preferred (Houben-Weyl, 11/1 861 (1957)). In this modification, the amide is heated with an agent giving off bromine or chlorine, in particular with bromine, in the presence of an alkali metal alkanolate.

Water is used as solvent for the usual acid amide degradation. The modified process is performed in an alkanol, in particular in methanol or ethanol. The alkanolates corresponding to the alkanol used as solvent, e.g. sodium methylate, ethylate, potassium methylate or ethylate, are used as alkali metal alkanolates. The carbamic acid ester (urethane) so obtained can be hydrolysed in a basic or acid medium. Alkaline hydrolysis is preferred, for which inorganic bases, e.g. the alkali and alkaline earth metal hydroxides, are particularly suitable.

For acid hydrolysis, e.g. hydrohalic acids, glacial acetic acid, halogenated acetic acids or mixtures of such acids can be used. Alkanols can be used as solvents for the hydrolysis, e.g. methanol or ethanol, water or alkanol/water mixtures.

For the degradation of the azide according to Curtius, either the carboxylic acid is converted into the carboxylic acid chloride which is then reacted with an alkali metal azide, e.g. with sodium azide, to form the desired carboxylic acid azide; or one of the alkyl esters such as the methyl or ethyl ester is converted directly into the carboxylic acid azide with hydrazine hydrate and nitrous acid, preferably in the presence of a solvent or diluent. The decomposition of the azide to the amine can be performed directly, e.g. by reaction with trifluoroacetic acid. It is advantageous, however, firstly to convert the azide to the isocyanate by thermal decomposition in a solvent which is inert to the reaction components, e.g. aromatic hydrocarbons such as benzene, toluene, xylenes, higher boiling ethers such as dioxane, then to isolate the isocyanate and react it with (a) an alkanol, e.g. methanol, ethanol, tert. butanol etc., or (b) glacial acetic acid and acetic acid anhydride. In the former case, the carbamic acid ester (urethane) corresponding to the alkanol used is obtained as reaction product and this can be hydrolysed to the amine as described above. In case (b), the acetylated amine is obtained as reaction product, which is converted to the free base by alkaline hydrolysis.

Octahydro - 1,2,4 - methenopentalenyl-(5)-carboxylic acid can be obtained by the process described by H. K. Hall [J. Org. Chem. 25, 42 (1960)] by reaction of bicyclo [2.2.1]hepta - 2,5 - dien(2,5-norbornadien) with acrylonitrile in the presence of copper-II acetate and subsequent alkaline hydrolysis of the octahydro-1,2,4-methenopentalenyl-(5)-cyanide formed.

Octahydro - 1,2,4 - methenopentalenyl - (5) - amine as well as its acid addition salts have now been found to unexpectedly exhibit valuable pharmacological properties. They show excellent antiviral activity, particularly against influenza virus $A_2$.

This antiviral activity of a compound of the invention is illustratively demonstrated by the following test:

Each member of a group of 10 mice of the strain NMRI is infected intranasally with a suspension of influenze virus $A_2$/Bethesda/10/60 in a dose being just lethal (LD 100 min.: 0.05 ml. of a virus suspension, obtained from mice lungs, in Hanks solution in a concentration of $10^{-2}$). This group of mice having a mean survival time of 5.1 days serves as control. To each member of a second group of 10 mice of the same strain is administered either subcutaneously or orally 0.5 ml. of a sterile water solution of octahydro - 1,2,4 - methenopentalenyl - (5) - amine hydrochloride of the appropriate concentration. Thirty minutes thereafter, to this second group of mice, is administered intranasally the same amount of the virus preparation described above which has been administered to the control group. This second group is then treated on each of the following three days with the same amount of drug and in the same way as on the first day. The mean survival time is determined and compared with the one of the first group.

Thus, it is found that e.g. octahydro-1,2,4-methenopentalenyl-(5)-amine hydrochloride given subcutaneously in a daily dose of 25 mg./kg. has an excellent effect on the survival time of the test animals. A similar or even better prolongation of the survival time is obtained on oral administration of the drug in an amount of 12.5 mg./kg., per die.

The toxicity of octahydro-1,2,4-methenopentalenyl-(5)-amine hydrochloride is of low order and its acute $LD_{50}$ in mice is about 250 mg./kg. s.c. and 910 mg./kg. p.o., respectively.

Their pharmacological properties render the octahydromethenopentalenylamine of Formula I as well as its pharmaceutically acceptable acid addition salts suitable as agents for controlling infections caused by a virus, especially of infections caused by influenza virus $A_2$.

The compound of Formula I may also be employed as an intermediate in the production of other compounds with valuable pharmacological properties.

For their intended use as antiviral agents the compounds of the invention may be administered parenterally or orally, preferably orally in amounts depending on the species, age and weight of the subject under treatment as well as on the particular conditions to be treated and the mode of administration. In general, the daily doses of octahydro-1,2,4-methenopentalenyl-(5)-amine, or the pharmaceutical acceptable acid addition salt thereof, vary between about 1 mg./kg. and about 15 mg./kg., the single dose thereby being between about 0.5 mg./kg. and 10 mg./kg.

Therapeutical compositions according to the invention for treatment of virus diseases contain, as active substance, octahydro - 1,2,4 - methenopentalenyl-(5)-amine and/or at least one pharmaceutically acceptable salt thereof in a form suitable for oral, rectal, local or parenteral administration. As pharmaceutically acceptable salts, those with inorganic and organic acids are suitable which in the usual dosages have no physiological action of their own or have a desirable action, e.g. an antibacterial or fungistatic action. Such acids are, e.g. hydrochloric acid, hydrobromic acid, sulphuric acid, phosphoric acid, methane sulphonic acid, ethane sulphonic acid, β-hydroxyethane sulphonic acid, acetic acid, lactic acid, succinic acid, fumaric acid, maleic acid, malic acid, tartric acid, citric acid, benzoic acid, salicyclic acid, phenylacetic acid, mandelic acid or embonic acid.

Dosage units for oral administration preferably contain between 10% and 90% of octahydro-1,2,4-methenopentalenyl-(5)-amine or of one of its pharmaceutically acceptable salts as active ingredient. Such dosage units are produced by mixing the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, and pressing the mixture into tablets or dragée (sugar coated tablet) cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance.

Examples of dosage units for rectal administration are suppositories which consist of a combination of octahydro-1,2,4-methenopentalenyl-(5)-amine or a suitable pharmaceutically acceptable salt thereof, with a neutral fatty foundation, or also gelatine rectal capsules which contain a combination of the active substance or of a suitable salt thereof, with polyethylene glycols of suitable molecular weight.

Ampoules for parenteral, particularly intravenous, intramuscular or subcutaneous, administration contain octahydro-1,2,4-methenopentalenyl-(5)-amine or a water soluble, pharmaceutically acceptable salt thereof, in a concentration of, preferably, 0.5–10%, optionally together with suitable stabilizing agents and buffer substances in aqueous solution.

Other forms for administration, particularly for the treatment of virus infections of the bronchial passages are syrups and aerosols and, for the local treatment of virus diseases, ointments and powders can be used. All these forms for administration can be prepared by using common carriers, diluents and additives.

The following examples describe the production of the compounds of the invention and therapeutic compositions thereof. The temperatures are given in degrees centigrade.

EXAMPLE 1

1st step 10 g. of octahydro-1,2,4-methenopentalenyl-(5)-carboxylic acid ethyl ester, 40 ml. of a 26% aqueous ammonia solution and 5 ml. of methanol are heated in an autoclave for 10 hours at 140°. Volatile parts are removed from the reaction product by water jet vacuum. 25 ml. of acetone are added to the residue, the mixture is filtered and the residue is recrystallised from water. The octahydro-1,2,4-methenopentalenyl - (5) - carboxylic acid amide obtained melts at 160–169° (with decomposition).

2nd step 16.3 g. of octahydro-1,2,4-methenopentalenyl-(5)-carboxylic acid amide are dissolved in 500 ml. of methanol. 11 g. of sodium methylate are then added and the solution is cooled to 5°. 16 g. of bromine are added, the whole is left to stand for 30 minutes and then heated in a steam bath for 45 minutes. Acetic acid is then added until the mixture is neutral and all volatile products are removed by evaporation. The residue is shaken with 100 ml. of water. The water is decanted. 250 ml. of petroleum ether are added to the insoluble residue, the whole is left to stand for some hours and then filtered. The filtrate is concentrated, and the oily residue is distilled. It boils at 97–101°/0.02 torr. The octahydro-1,2,4-methenopentalenyl-(5)-carbamic acid methyl ester crystallises and, after recrystallisation from petroleum ether, melts at 84–86°.

3rd step 29 g. of octahydro-1,2,4-methenopentalenyl-(5)-carbamic acid methyl ester and 42 g. of potassium hydroxide are boiled in 50 ml. of water and 200 ml. of diethylene glycol monomethyl ether as solvent. 35 ml. of water are slowly distilled off; the solution finally boils at 125°. It is then boiled for 8 hours. The mixture is poured into 600 ml. of water and the solution is extracted 5 times with 80 ml. of ether each time. The ether extracts are combined and washed twice with 20 ml. of saturated sodium chloride solution each time and then dried over sodium sulphate. After removal of the ether, distillation at 82–84°/12 torr yields 18.3 g. of an oily product. This amine still contains diethylene glycol monomethyl ether as impurity and is purified by way of the hydrochloride.

221 g. of crude amine are dissolved in 1300 ml. of dry ether and hydrogen chloride is introduced into the solution at 0° until no further hydrochloride precipitates. The octahydro-1,2,4-methenopentalenyl-(5)-amine hydrochloride is isolated, washed with ether and dried in vacuo, and melts at 265–270°.

117 g. of octahydro-1,2,4-methenopentalenyl-(5)-amine hydrochloride are dissolved in 100 ml. of water and the solution is shaken with 200 ml. of 4 N sodium hydroxide solution. The amine which separates is taken up in four 150 ml. portions of ether. The combined ethereal solutions are dried with sodium sulphate. After removal of the ether and distillation, the pure amine is obtained as a colourless liquid. The octahydro-1,2,4-methenopentalenyl-(5)-amine distills at 81–83°/12 torr, $n_D^{20}$: 1.5160.

EXAMPLE 2

1st step 164 g. of octahydro-1,2,4-methenopentalenyl-(5)-carboxylic acid, 1000 ml. of benzene and 4 ml. of pyridine are slightly heated in a steam bath. 250 g. of thionyl chloride are added dropwise within 15 minutes in such a way that the reaction proceeds by itself with continuous development of $SO_2$. On completion of the addition, the whole is heated for another 15 minutes in the steam bath. 200 ml. of petroleum ether are added to the residue, the whole is left to stand for 30 minutes and then filtered. The solvent is removed in a rotatory evaporator. The octahydro-1,2,4 - methenopentalenyl-(5)-carboxylic acid chloride distills at 63–65°/2 torr (162.7 g., 88.5%).

2nd step 93.6 g. of sodium azide are dissolved in 1720 ml. of 50% aqueous acetone and the solution is cooled to 0°. 90 g. of octahydro - 1,2,4 - methenopentalenyl-(5)-carboxylic acid chloride are added within 5 to 10 minutes. The temperature in the reaction vessel is kept at 0–2° by exterior cooling. On completion of the addition, the whole is stirred at 0° for another 50 minutes. The solution is then extracted, first with 1000 ml. of ice cold benzene and then a second time with 300 ml. of ice cold benzene. The combined benzene extracts are then dried with finely pulverised calcium chloride at 0–5°. Calcium chloride is filtered off and the solution of the octahydro-1,2,4-methenopentalenyl-(5)-carboxylic acid azide is heated for 2½ hours in a steam bath. Nitrogen is developed and the solution foams. The benzene is then distilled off. The octahydro - 1,2,4 - methenopentalenyl-(5)-isocyanate distills at 70–75°/3 torr.

3rd step 16.1 g. of octahydro-1,2,4-methenopentalenyl-(5)-isocyanate are refluxed for 100 minutes in a mixture of 25 ml. of acetic acid and 15 ml. of acetic anhydride. On completion of the $CO_2$ development, 35 ml. of the solvent are distilled off. The residue is poured into 100 ml. of water and then stirred for 3 hours. The precipitated crystalline product is taken up in 175 ml. of ether, the ethereal solution is washed with 15 ml. of water and dried over sodium sulphate. After removal of the ether, the residue is distilled at 120–125°/0.05 torr. The octahydro-1,2,4-methenopentalenyl-(5)-acetylamine crystallises and melts at 77–80°.

4th step 26.5 g. of octahydro-1,2,4-methenopentalenyl-(5)-acetylamine dissolved in 200 ml. of diethylene glycol monomethyl ether and a solution of 42 g. of potassium hydroxide in 50 g. of water are mixed and 35 ml. of water are slowly distilled off. The remaining mixture is refluxed for 8 hours (inner temperature 120°) and poured into 600 ml. of water. The amine is taken up in five 80 ml. portions of ether. The combined ether extracts are washed twice with 20 ml. of saturated sodium chloride solution each time and then dried over sodium sulphate. After removal of the ether, distillation at 82–84°/12 torr yields 18.3 g. of the oily amine. As the distillate still contains diethylene glycol monomethyl ether, it is purified as follows: 221 g. of crude amine are dissolved in 1.500 ml. of dry ether and hydrogen chloride is introduced into the solution at 0° until no more salt is precipitated. The isolated octahydro-1,2,4-methenopentalenyl-(5)-amine hydrochloride is washed with ether and dried in vacuo. The hydrochloride is converted into the free base as described in Example 1, 3rd step.

EXAMPLE 3

A mixture of 18.3 g. (0.1 mol) of octahydro-1,2,4-methenopentalenyl-(5)-carboxylic acid chloride, 6.9 g. (0.1 mol) of hydroxylamine chloride and 8 g. of pyridine in 50 ml. of benzene is stirred for 80 minutes at 25°. Then 200 ml. of ice-water are added to the reaction mixture and the water is decanted from the oil that separates. The oil is taken up in ether and the ethereal solution is dried over sodium sulphate. The ether is removed by distillation. The oily residue is taken up in 150 ml. of acetic anhydride and heated to the boiling point for 15 minutes. The reaction mixture is then poured into water and left to stand for 2 hours. The oil that separates is taken up in ether, the ethereal solution is dried over sodium sulphate and the ether is removed by distillation under reduced pressure. The residual oil is heated to 200° until the development of gas ceases, and then distilled. The octahydro-1,2,4-methenopentalenyl-(5)-isocyanate thus obtained distills at 70°/3 torr. This isocyanate is transformed into octahydro-1,2,4-methenopentalenyl-(5)-amine as described in the 3rd and 4th steps, of Example 2.

EXAMPLE 4

250 g. of active substance, e.g. octahydro-1,2,4-methenopentalenyl-(5)-amine hydrochloride, are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. If desired, the tablets can be grooved for better adaptation of the dosage.

EXAMPLE 5

A granulate is produced from 250 g. of active substance, e.g. octahydro-1,2,4-methenopentalenyl-(5)-amine hydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are then coated with a concentrated syrup made from 502.28 g. of crystallised saccharose, 200 g. of talcum, 6 g. of shellac, 10 g. of gum arabic, 0.22 g. of dyestuff and 1.5 g. of titanium dioxide, and dried. The dragées obtained each weigh 140 mg. and contain 25 mg. of active substance.

What is claimed is:
1. Octahydro-1,2,4-methenopentalenyl-(5)-amine.
2. A pharmaceutically acceptable acid addition salt of the compound defined in claim 1.

References Cited

Freeman et al.: "Chem. Abstracts," v. 66, No. 10474v (1967).

CHARLES B. PARKER, Primary Examiner

D. R. PHILLIPS, Assistant Examiner

U.S. Cl. X.R.

260—501.1, 501.21; 424—315, 316